(12) United States Patent
Nakakubo

(10) Patent No.: US 10,270,341 B2
(45) Date of Patent: Apr. 23, 2019

(54) REGULATOR CIRCUIT AND SEMICONDUCTOR INTEGRATED CIRCUIT DEVICE

(71) Applicant: FUJITSU SEMICONDUCTOR LIMITED, Yokohama-shi, Kanagawa (JP)

(72) Inventor: Atsushi Nakakubo, Fuchu (JP)

(73) Assignee: FUJITSU SEMICONDUCTOR LIMITED, Kanagawa (JP)

( * ) Notice: Subject to any disclaimer, the term of this patent is extended or adjusted under 35 U.S.C. 154(b) by 9 days.

(21) Appl. No.: 15/609,957

(22) Filed: May 31, 2017

(65) Prior Publication Data

US 2018/0006563 A1 Jan. 4, 2018

(30) Foreign Application Priority Data

Jun. 30, 2016 (JP) .................................. 2016-130989

(51) Int. Cl.

| | |
|---|---|
| G05F 3/02 | (2006.01) |
| H02M 3/158 | (2006.01) |
| H02M 1/08 | (2006.01) |
| H02M 1/32 | (2007.01) |
| G05F 1/56 | (2006.01) |
| H02M 1/00 | (2006.01) |

(52) U.S. Cl.
CPC .............. *H02M 3/158* (2013.01); *G05F 1/56* (2013.01); *H02M 1/08* (2013.01); *H02M 1/32* (2013.01); *H02M 2001/0025* (2013.01); *H02M 2001/0054* (2013.01)

(58) Field of Classification Search
None
See application file for complete search history.

(56) References Cited

U.S. PATENT DOCUMENTS

| | | | |
|---|---|---|---|
| 7,015,735 B2 * | 3/2006 | Kimura | ................... H03L 7/087 327/157 |
| 2006/0119421 A1 | 6/2006 | Kouno et al. | |
| 2013/0221939 A1 * | 8/2013 | Endo | ........................ G05F 1/10 323/271 |

FOREIGN PATENT DOCUMENTS

| | | |
|---|---|---|
| JP | 2006-146421 A | 6/2006 |
| JP | 2014-128038 A | 7/2014 |

* cited by examiner

*Primary Examiner* — Long Nguyen
(74) *Attorney, Agent, or Firm* — Westerman, Hattori, Daniels & Adrian, LLP

(57) ABSTRACT

A regulator circuit includes a first transistor reducing an external supply voltage and outputting an internal active voltage to an output node; a first detector receiving a criteria level, detecting the internal active voltage based on an enable signal, controlling a gate voltage of the first transistor, and adjusting an output current thereof; a second transistor reducing the external supply voltage, and outputting an internal standby voltage corresponding to the internal active voltage to the output node; a second detector receiving a reference voltage, detecting the internal standby voltage regardless of the enable signal, controlling a gate voltage of the second transistor, and adjusting an output current thereof; a first switch controlling whether to output the reference voltage as the criteria level of the first detector; and a second switch controlling whether to output the voltage of the output node as the criteria level of the first detector.

18 Claims, 15 Drawing Sheets

REGULATOR CIRCUIT AND SEMICONDUCTOR INTEGRATED CIRCUIT DEVICE

CROSS-REFERENCE TO RELATED APPLICATION

This application is based upon and claims the benefit of priority of the prior Japanese Patent Application No. 2016-130989, filed on Jun. 30, 2016, the entire contents of which are incorporated herein by reference.

FIELD

The embodiments discussed herein are related to a regulator circuit and a semiconductor integrated circuit device.

BACKGROUND

Regulator circuits regulate (reduce) an external supply voltage to an internal voltage used for internal circuits such as memory and logic circuits. Regulator circuits are applied to various semiconductor integrated circuit devices.

For example, a regulator circuit is available which reduces an external supply voltage (Vin), supplies a low power internal voltage (Vos) to an internal circuit in a standby state (Sw), and supplies a high power internal voltage (Vo) to the internal circuit in an active state (Sa).

However, such a regulator circuit causes, for example, noise (coupling noise) when shifting from a standby state to an active state, leading to difficulty in supplying a stable internal voltage to an internal circuit.

As a solution for reducing the influence of coupling noise, for example, a capacity for holding a reference voltage (Vr) may be increased or the supply current of a reference voltage generating circuit for generating the reference voltage may be increased. In addition, the reference voltage generating circuit may be switched between a standby state and an active state.

Unfortunately, this technique is not preferable because a current consumed in a standby state is increased or the circuit area is expanded or becomes complicated.

Incidentally, in the past, various suggestions have been presented as regulator circuits which reduce an external supply voltage, convert the level to an internal voltage suitable for an internal circuit, and output it.

Patent Document 1: Japanese Laid-open Patent Publication No. 2006-146421

Patent Document 2: Japanese Laid-open Patent Publication No. 2014-128038

SUMMARY

According to an aspect of the embodiments, there is provided a regulator circuit including a first transistor of a first conductivity type; a first detector; a second transistor of the first conductivity type; a second detector; a first switch; and a second switch. The first transistor is configured to reduce an external supply voltage and output an internal active voltage to an output node, and the first detector is configured to receive a criteria level, detect the level of internal active voltage based on a state of an enable signal, control a gate voltage of the first transistor, and adjust an output current of the first transistor.

The second transistor is configured to reduce the external supply voltage and output an internal standby voltage corresponding to the internal active voltage to the output node, and the second detector is configured to receive a reference voltage, detect the level of internal standby voltage regardless of the state of the enable signal, control a gate voltage of the second transistor, and adjust an output current of the second transistor. The first switch is configured to control whether to output the reference voltage as the criteria level of the first detector, and the second switch is configured to control whether to output the voltage of the output node as the criteria level of the first detector.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
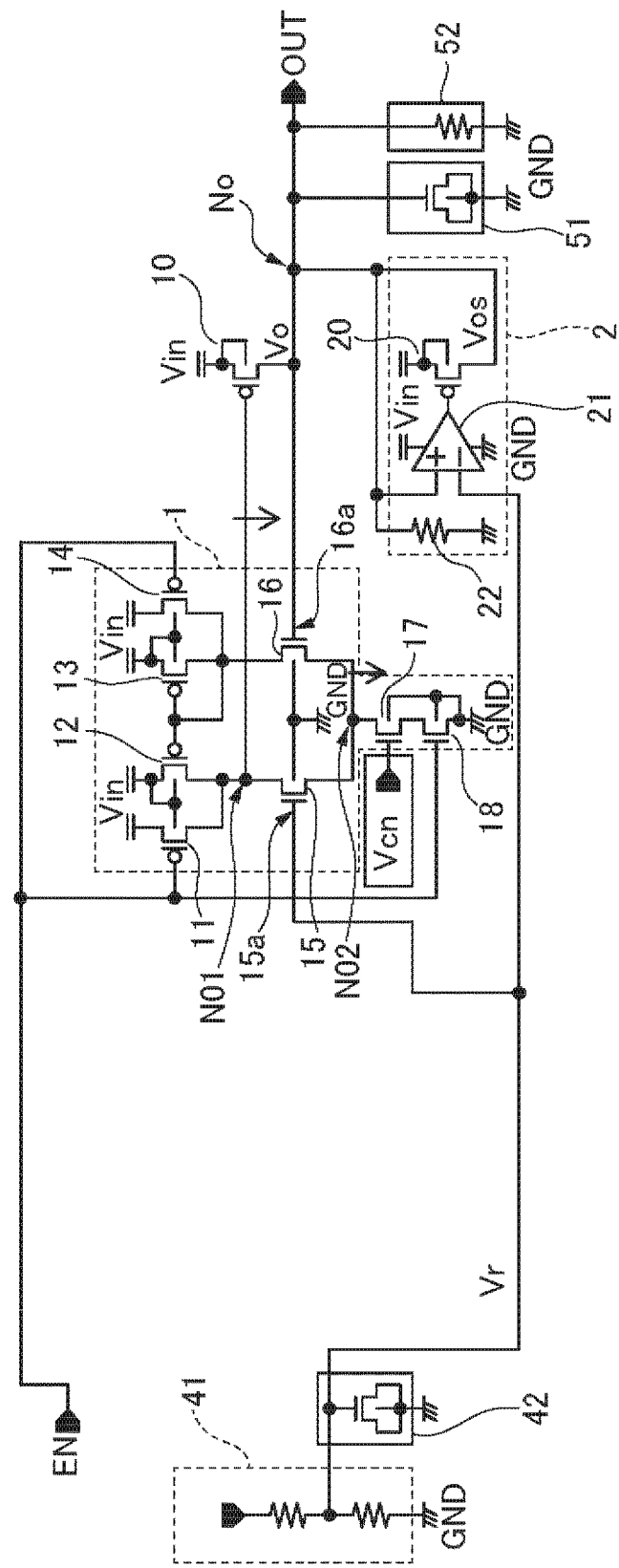
FIG. 1 is a circuit diagram illustrating an example of a regulator circuit.

First, before a detailed description of embodiments of the regulator circuit and a semiconductor integrated circuit device, an example of a regulator circuit and the problems of the regulator circuit will be explained with reference to FIG. 1 and FIG. 2. FIG. 1 is a circuit diagram illustrating an example of a regulator circuit that reduces a high voltage (external supply voltage) Vin and generates an internal active voltage Vo at an output node No through a feedback loop where a p-channel type MOS (pMOS) transistor 10 is used as a driver.

In FIG. 1 to FIG. 10 of the present specification, a transistor of a first conductivity type is a pMOS transistor and a transistor of a second conductivity type is an n-channel type MOS (nMOS) transistor. However, as illustrated in FIG. 11 to FIG. 14, it is apparent that the transistor of the first conductivity type may be an nMOS transistor and the transistor of the second conductivity type may be a pMOS transistor.

As illustrated in FIG. 1, a regulator circuit 300 includes a transistor (first transistor) 10 that generates the internal active voltage Vo, a detector (first detector) 1, and an internal standby voltage generating circuit 2 that generates the internal standby voltage Vos. The regulator circuit 300 further includes a reference voltage generating circuit 41 that generates a reference voltage Vr and a reference voltage holding capacitor 42 that holds a generated reference voltage Vr. The reference voltage holding capacitor 42 may have a small capacitance value because the reference voltage Vr has a small current consumption.

The regulator circuit 300 further includes an internal voltage holding capacitor 51 that holds the voltage of the output node No (output OUT) and an overshoot-preventing current load 52 that prevents an excessive change of the voltage of the output node No. The internal voltage holding capacitor 51 has a large capacitance value because the current consumption of the internal active voltage Vo in, for example, an active state Sa is larger than that of a destination circuit. The reference voltage generating circuit 41, the reference voltage holding capacitor 42, the internal voltage holding capacitor 51, the current load 52, and so on may be provided outside of the regulator circuit 300.

The first transistor 10 is, for example, a pMOS transistor. The first transistor 10 reduces the external supply voltage Vin applied to the source of the first transistor 10 and outputs the reduced internal active voltage Vo to the output node No connected to the drain of the first transistor 10. The first detector 1 includes pMOS transistors 11 to 14 and nMOS transistors 15 to 18. The nMOS transistors 15 and 16 operate as differential pair transistors of the first detector 1.

In other words, the reference voltage Vr is applied to a gate 15a of the transistor 15 while the voltage of the output node No is applied to a gate 16a of the transistor 16. The external supply voltage Vin is applied to the sources of the transistors 11 to 14 and the drains of the transistors 11 and 12 are connected in common to the drain of the transistor 15 and the gate of the transistor 10. The drains of the transistors 13 and 14 are connected in common to the gates of the transistors 12 and 13 and the drain of the transistor 16.

Transistors 17 and 18 are connected in series between the source (node NO2) of the transistors 15 and 16 and a ground level (GND). A control signal Vcn is input from the outside to the gate of the transistor 17 whose drain is connected to the node NO2. An enable signal EN is input to the gates of the transistors 11, 14, and 18. Moreover, the first detector 1 is placed in an inactive state (standby state Sw) when the enable signal EN is set at a low level "L", whereas the first detector 1 is placed in an active state Sa when the enable signal EN is set at a high level "H". For example, the standby state Sw is set for a small current consumption (or in the absence of current consumption) at the node No (Vos) in a destination circuit (internal circuit). The active state Sa is set for a large current consumption at the node No (Vo) in the internal circuit.

The first detector 1 is placed in the standby state Sw and the active state Sa based on the state of the enable signal EN, detects the reference voltage Vr and the internal active voltage Vo by means of the differential pair transistors 15 and 16, and controls the gate voltage of the first transistor 10. In other words, the first detector 1 adjusts the output of the first transistor 10 such that the level of internal active voltage Vo is equal to the level of reference voltage Vr. The control signal Vcn is an analog signal. For example, when a high-speed operation is needed with a large power consumption, the control signal Vcn has a higher level and passes a large current, whereas when a high-speed operation is not needed, the control signal Vcn has a lower level and reduces power consumption.

The internal standby voltage generating circuit 2 constantly generates the internal standby voltage Vos and outputs the internal standby voltage to the output node No regardless of the state of the enable signal EN. The internal standby voltage Vos is output to the output node No even in the standby state Sw. The internal standby voltage generating circuit 2 includes a pMOS transistor (second transistor) 20 corresponding to the first transistor 10, a second detector (operational amplifier) 21 corresponding to the first detector 1, and a load 22 corresponding to the current load 52. For example, the internal standby voltage generating circuit 2 outputs the internal standby voltage Vos, which corresponds to the reference voltage Vr (internal active voltage Vo), to the output node No, but only needs a small power supply, leading to a small circuit size.

Figure 2:
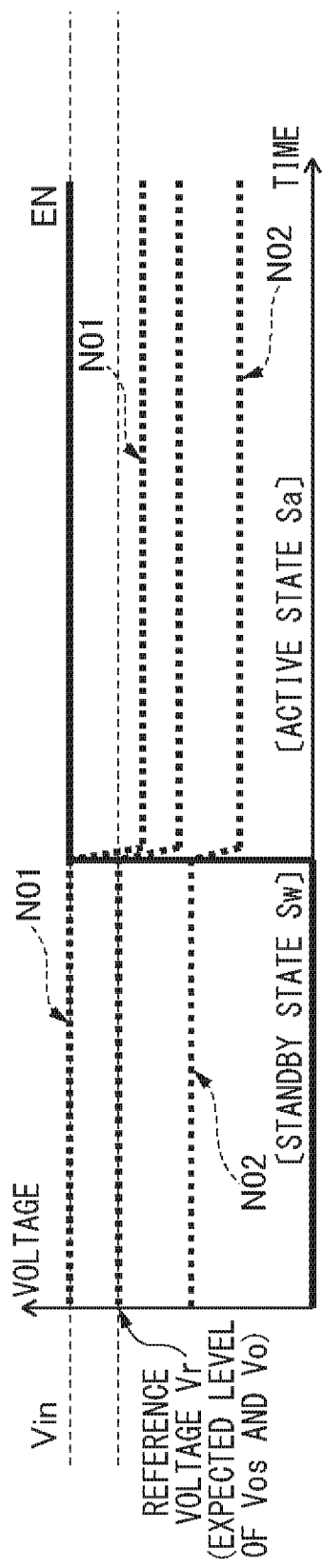
FIG. 2 is an explanatory drawing of an operation of the regulator circuit illustrated in FIG. 1.

FIG. 2 illustrates an operation of the regulator circuit depicted in FIG. 1. As depicted in FIG. 2, in the standby state Sw, the enable signal EN is set at "L", the nMOS transistor 18 is turned off, and the pMOS transistors 11 and 14 are turned on. Thus, the node NO1 (the gate of the pMOS transistor 10) has the level of external supply voltage Vin ("H"), the transistor 10 is turned off, and the output node No receives the internal standby voltage Vos from the internal standby voltage generating circuit 2. The voltage of the node NO2 (the common connection node of the sources of the transistors 15 and 16 and the drain of the transistor 17) increases to Vos−Vthn where Vthn is the threshold of the nMOS transistor. This is because the transistor 18 is turned off to stop the current of the first detector 1.

Subsequently, when the state is changed from the standby state Sw to the active state Sa, and the enable signal EN shifts from "L" to "H", the voltage of the node NO1 decreases to Vin−Vthp or lower where Vthp is the threshold of the pMOS transistor. Furthermore, the reference voltage Vr is reduced below the original level by the coupling capacitance of the transistor 15. This prevents the transistor 10 from outputting the normal level of internal active voltage Vo to the output node No, reducing the voltage of the node NO2 from Vo−Vthn (Vos−Vthn) to Vcn+α.

In other words, when the status is switched from the standby state Sw to the active state Sa, the voltages of the nodes NO1 and NO2 in the first detector 1 decrease to a level determined by the circuit characteristics, and the reference voltage Vr is then reduced by the coupling of the transistor 15 with the nodes NO1 and NO2 serving as the drain and source of the transistor 15. In addition, the first detector 1 does not normally operate based on the reference voltage Vr and thus the first transistor 10 has difficulty in outputting the normal level of internal active voltage Vo to the output node No.

As a solution for reducing the influence of such coupling noise, for example, the capacitance value of the reference voltage holding capacitor 42 that holds the reference voltage Vr may be increased to reduce the range of fluctuations in the reference voltage Vr according to a capacitance ratio. The capacitance value of the reference voltage holding capacitor 42 is determined according to, for example, a permissible range of fluctuations in the internal active voltage Vo and a capacitance ratio relative to the device size of the transistor 15. However, for example, in the case of a small permissible range of fluctuations in the internal active voltage Vo or when the transistor 15 has a large device size in response to high responsivity, the size is increased to raise the capacitance value of the reference voltage holding capacitor 42, thereby expanding the circuit area.

Moreover, the supply current of the reference voltage generating circuit 41 for generating the reference voltage Vr may be increased to restore the fluctuations in the reference voltage Vr in a short time. In this case, the current consumption of the reference voltage generating circuit 41 is increased, leading to larger power consumption in the standby state Sw. Furthermore, a technique of switching the reference voltage generating circuit 41 between the standby state Sw and the active state Sa may be also applicable. In this case, the technique may cause a larger circuit size and a complicated circuit system or lead to an unstable factor of the reference voltage Vr.

Figure 3:
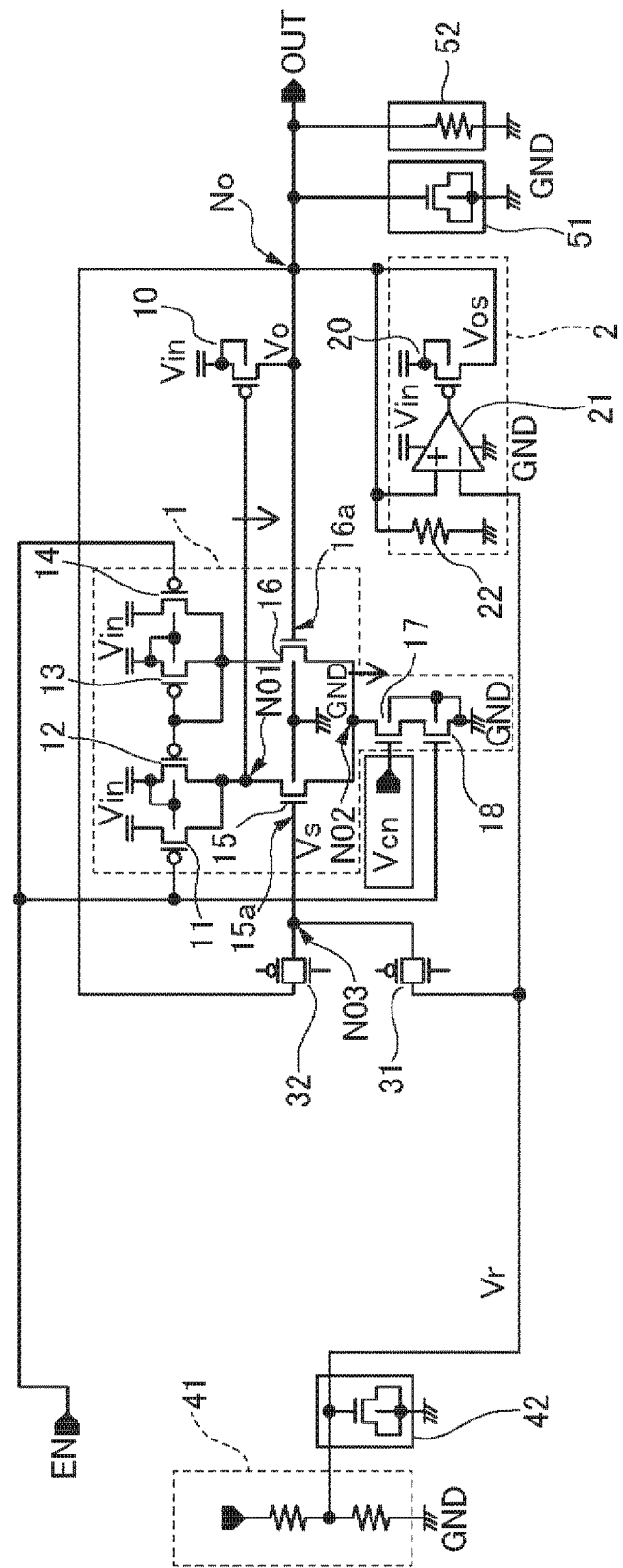
FIG. 3 is a circuit diagram illustrating a first embodiment of the regulator circuit.
Figure 4:
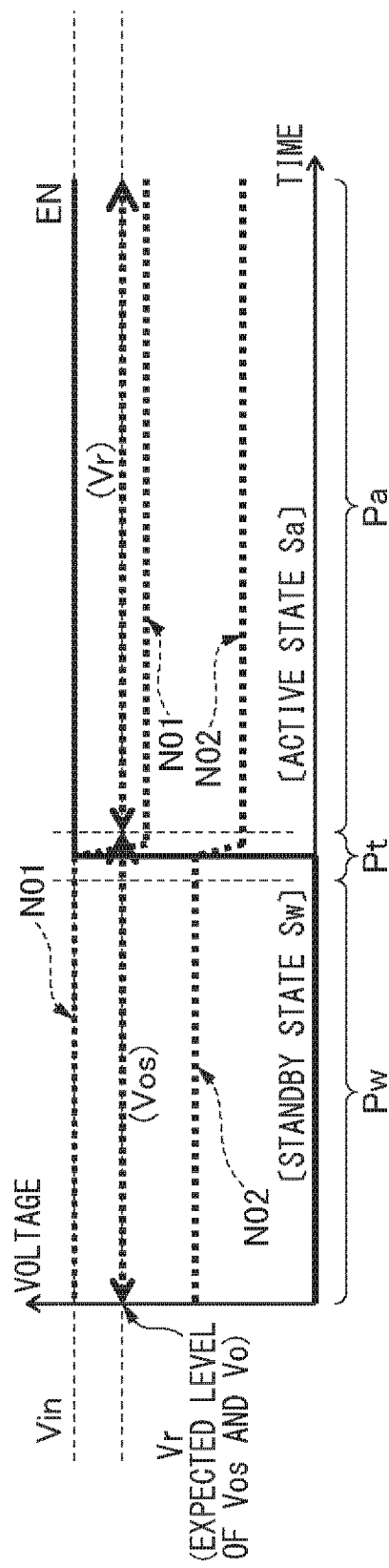
FIG. 4 is an explanatory drawing of an operation of the regulator circuit illustrated in FIG. 3.

The embodiments of the regulator circuit and the semiconductor integrated circuit device will be specifically described below with reference to the accompanying drawings. FIG. 3 is a circuit diagram illustrating a first embodiment of the regulator circuit. FIG. 4 is an explanatory drawing of an operation of the regulator circuit illustrated in FIG. 3. As is evident from a comparison between FIG. 3 and FIG. 1, a regulator circuit 100 of the first embodiment includes two switches 31 and 32 for a gate 15a of an nMOS transistor 15 in the first detector 1.

In other words, the first switch 31 is provided between the output (reference voltage Vr) of a reference voltage generating circuit 41 and the gate 15a of the transistor 15, and the second switch 32 is provided between an output node No and the gate 15a of the transistor 15. The first switch 31 and the second switch 32 may be, for example, CMOS transfer gates (CMOS switches) including a pMOS transistor and an nMOS transistor. Using the CMOS transfer gate may suppress the occurrence of noise upon switching. The pMOS and nMOS transistors forming the CMOS switch are preferably identical in gate capacitance.

The first switch 31 controls whether to supply the reference voltage Vr as the criteria level Vs of the gate 15a of the transistor 15 in the first detector 1, whereas the second switch 32 controls whether to supply the internal standby voltage (Vos) of the output node No as the criteria level Vs. As depicted in FIG. 4, for example, in a period Pt for switching from the standby state Sw to the active state Sa (or a period for switching from the active state Sa to the standby state Sw), the first switch 31 is turned off and the second switch 32 is turned on. Thus, the voltage (internal standby voltage Vos) of the output node No is supplied as the criteria level Vs to the gate 15a of the transistor 15.

In a period Pa in the active state Sa except for the switching period Pt, the first switch 31 is turned on, the second switch 32 is turned off, and the reference voltage Vr (or a level corresponding to Vr) is then supplied as the criteria level Vs to the gate 15a of the transistor 15. Moreover, in a period Pw in the standby state Sw, except for the switching period Pt, the first switch 31 is turned off, the second switch 32 is turned on, and the internal standby voltage (Vos) of the output node No is then input to the gate 15a of the transistor 15. In the period Pw in the standby state Sw, except for the switching period Pt, the reference voltage Vr may be input as the criteria level Vs instead of the internal voltage of the output node No. However, inputting the internal voltage of the output node No is more preferable because the number of times of switching may be reduced.

Since the output node No is connected to the output of an internal standby voltage generating circuit 2, for example, the voltage of the output node No in the standby state Sw is equal to the internal standby voltage Vos of the internal standby voltage generating circuit 2. In the active state Sa, the voltage of the output node No is equal to an internal active voltage Vo from a first transistor (pMOS driver) 10 but strictly speaking, the output (internal standby voltage Vos) of the internal standby voltage generating circuit 2 is added to the voltage of the output node No. Furthermore, the expected level (target level) of the internal standby voltage Vos and the expected level of the internal active voltage Vo are both equal to the reference voltage Vr. As described above, the output node No has an internal voltage holding capacitor 51 having a large capacitance value, reducing level fluctuations caused by the amount of current consumption in a destination internal circuit (memory or logic circuit) in the active state Sa. The reference voltage generating circuit 41, a reference voltage holding capacitor 42, the internal voltage holding capacitor 51, a current load 52 and so on may be provided inside or outside the regulator circuit 100.

In the regulator circuit of the first embodiment, in the period Pt for switching from the standby state Sw to the active state Sa (or the period for switching from the active state Sa to the standby state Sw), the first switch 31 is turned off and thus the reference voltage Vr is isolated from the gate 15a of the transistor 15. This does not transmit coupling noise from the transistor 15 to the reference voltage Vr. In the period PT, the internal voltage holding capacitor 51 connected to the output node No reduces the influence of coupling noise on the output node No.

In the switching period Pt and the period Pw in the standby state Sw, except for the period Pt, the expected level value of the internal standby voltage (Vos) of the output node No is equal to the reference voltage Vr, leading to the same state as the connection of the reference voltage Vr to the gate 15a of the transistor 15. In the period Pa in the active state Sa, except for the period Pt, the internal active voltage (Vo) of the output node No is controlled with the reference voltage Vr serving as an expected value.

As described above, according to the present embodiment, the set voltage (the voltage of the gate 15a of the transistor 15) of the first detector 1 that controls the first transistor 10 may be held at a specified level (reference voltage Vr) regardless of the influence of noise caused by switching between the standby state Sw and the active state Sa. This may generate a stable internal voltage without increasing current consumption in the standby state or causing an expanded or complicated circuit area.

Figure 5:
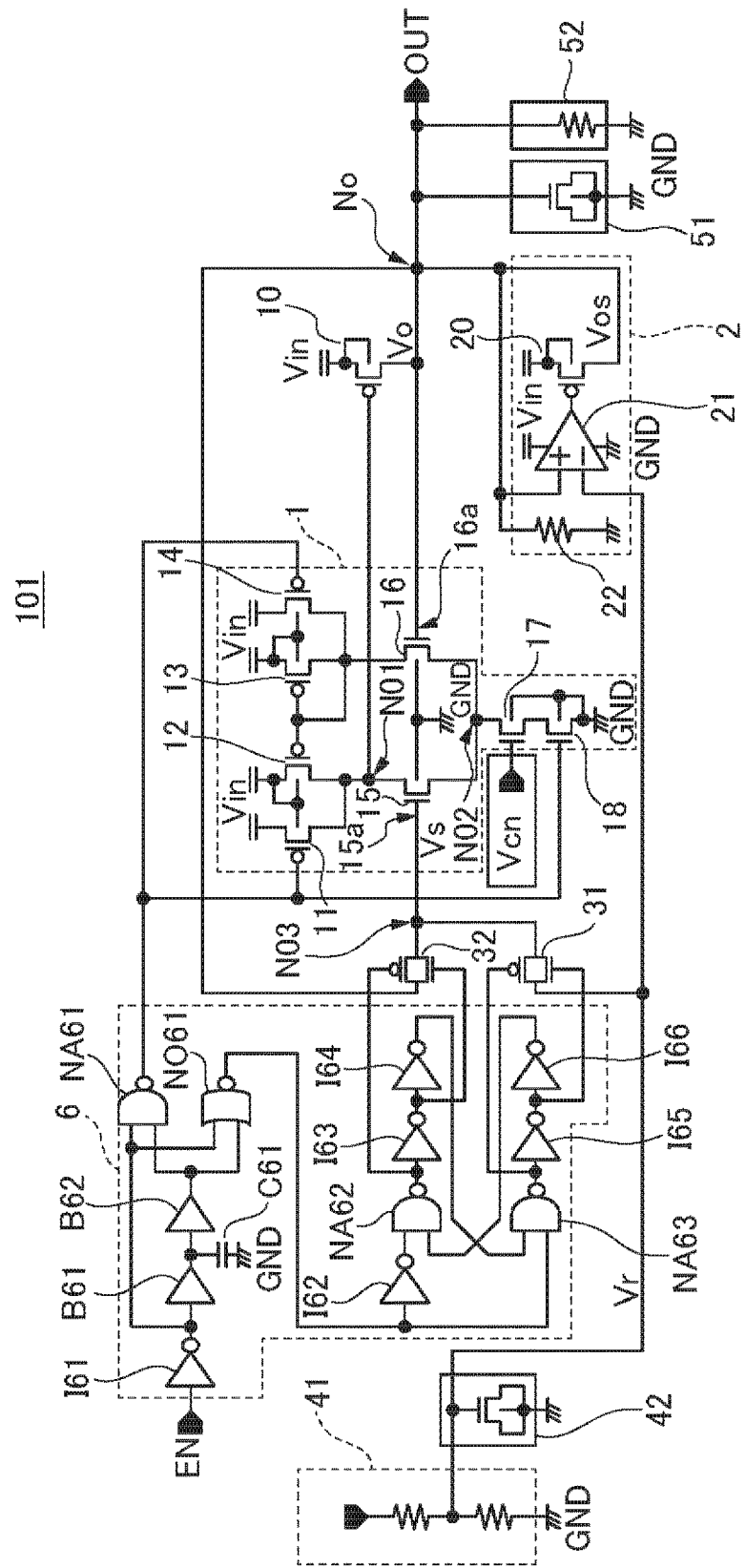
FIG. 5 is a circuit diagram illustrating a second embodiment of the regulator circuit.
Figure 6:
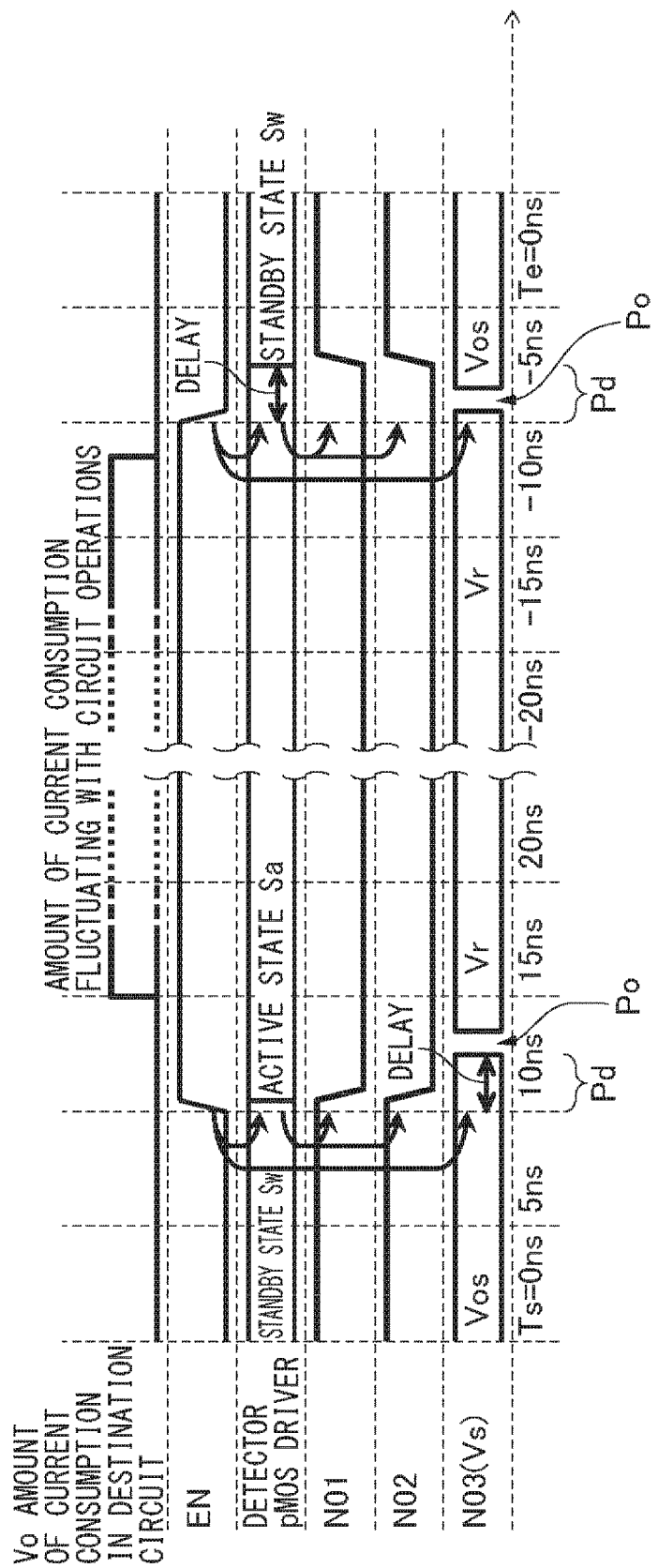
FIG. 6 is an explanatory drawing of an operation of the regulator circuit illustrated in FIG. 5.

FIG. 5 is a circuit diagram illustrating a second embodiment of the regulator circuit. FIG. 6 is an explanatory drawing of an operation of the regulator circuit illustrated in FIG. 5. As is evident from a comparison between FIG. 5 and FIG. 3, a regulator circuit 101 of the second embodiment further includes a switch control circuit (first switch control circuit) 6 unlike the regulator circuit 100 of the first embodiment.

As depicted in FIG. 5, the switch control circuit 6 controls an enable signal for the first detector 1 and first and second switches 31 and 32 and includes inverters 161 to 166, buffers B61 and B62, a capacitor C61, NAND gates NA61 to NA63, and an NOR gate NO61. The switch control circuit 6 controls the standby state Sw and the active state Sa of the first detector 1 based on the enable signal EN and turns on or off the first and second switches 31 and 32, causing the regulator circuit 101 to perform the operation of FIG. 6. It is apparent that the configuration of the switch control circuit 6 in FIG. 5 is merely exemplary and thus various modifications or changes may be made.

As illustrated in FIG. 6, a shift of the enable signal EN from "L" to "H" activates the first detector 1 and a first transistor 10, changing the voltages of the nodes NO1 and NO2. However, at the node NO3, a delay (delay period Pd) by the switch control circuit 6 continuously turns off the first switch 31 and turns on the second switch 32 and a connection to the output node No continuously inputs an output (internal standby voltage) Vos of an internal standby voltage generating circuit 2 to the node NO3. This may prevent a voltage change of the nodes NO1 and NO2 from affecting a reference voltage Vr as noise.

After a delay period Pd, the first and second switches 31 and 32 are both turned off in a period (off period) Po, and then the first switch 31 is controlled to be turned on while the second switch 32 is controlled to be turned off. The node NO3 (criteria level Vs) has the reference voltage Vr. Thus, the first detector 1 controls the first transistor 10 to output an internal active voltage Vo to an output node No with the reference voltage Vr which is an expected value. After the enable signal EN shifts from "L" to "H", the two switches 31 and 32 are turned off in the off period Po in order to prevent a short circuit between the output node No (Vos) and the reference voltage Vr when the voltage of the node NO3 is switched from the internal standby voltage Vos to the reference voltage Vr. Moreover, it is apparent that the internal active voltage Vo generated by the first transistor 10 is used by, for example, an internal circuit of the subsequent stage in the active state Sa but the amount of current consumption fluctuates with circuit operations.

A shift of the enable signal EN from "H" to "L" inactivates (deactivates) the first detector 1 and the first transistor 10 after the delay period Pd. After the off period Po, the first switch 31 is turned off and the second switch 32 is turned on while a node NO3 has the internal standby voltage Vos of the output node No. In addition, after a shift of the enable signal EN from "H" to "L", the off period Po during which the two switches 31 and 32 are both turned off is set in order to prevent a short circuit between the output node No (Vos) and the reference voltage Vr when the voltage of the node NO3 is switched from the reference voltage Vr to the internal standby voltage Vos.

In this way, according to the present embodiment, the set voltage of the first detector 1 that controls the first transistor 10 may be kept at the specified level (Vr) without being affected by noise caused by switching between the standby state Sw and the active state Sa. This may generate a stable internal voltage without increasing current consumption in the standby state or causing an expanded or complicated circuit area.

Figure 7:
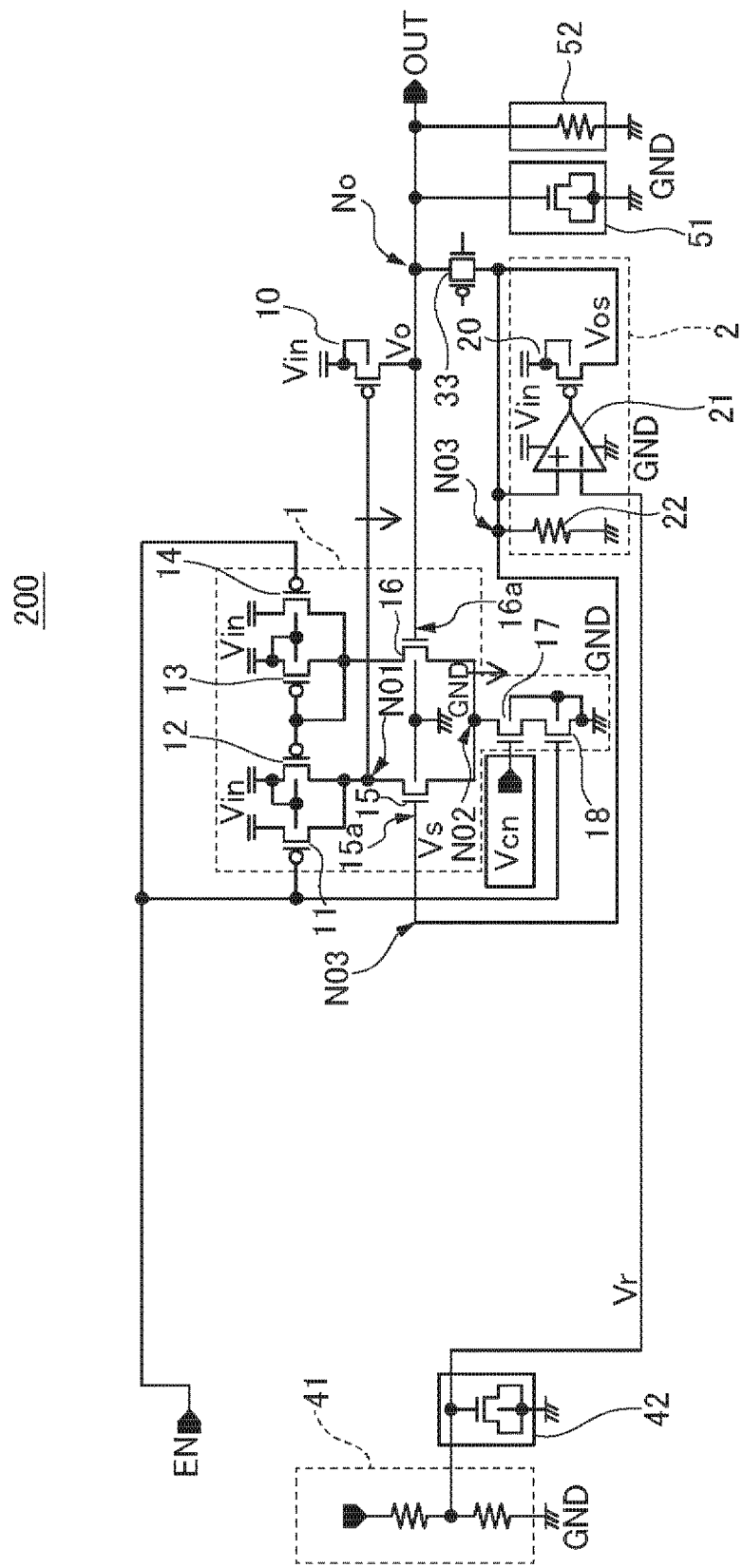
FIG. 7 is a circuit diagram illustrating a third embodiment of the regulator circuit.
Figure 8:
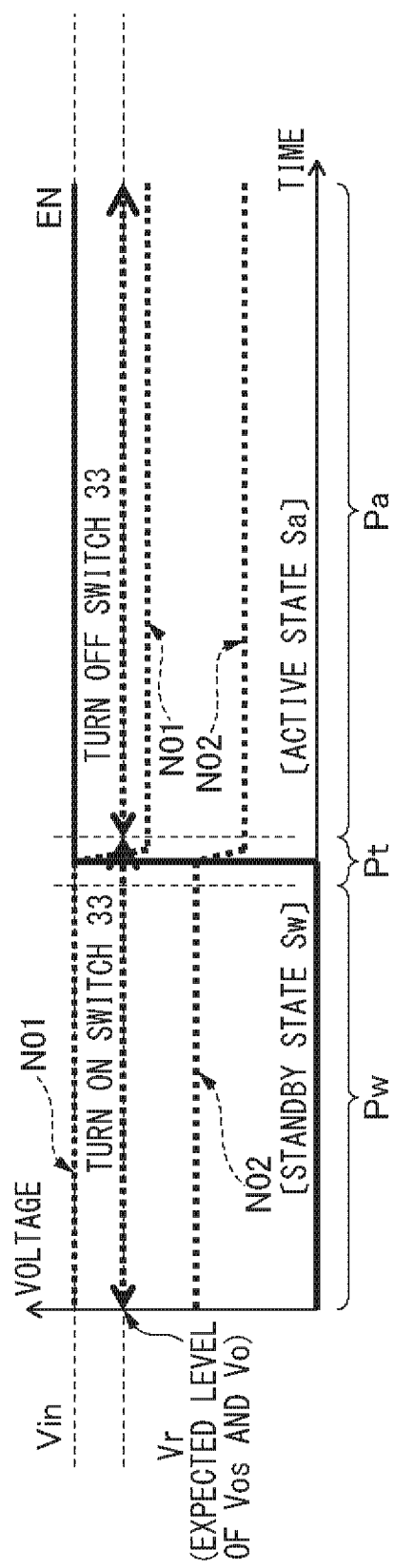
FIG. 8 is an explanatory drawing of an operation of the regulator circuit illustrated in FIG. 7.

FIG. 7 is a circuit diagram illustrating a third embodiment of the regulator circuit. FIG. 8 is an explanatory drawing of an operation of the regulator circuit illustrated in FIG. 7. As is evident from a comparison between FIG. 7 and FIG. 1, a regulator circuit 200 of the third embodiment includes a CMOS transfer gate (third switch) 33 between the output of an internal standby voltage generating circuit 2 and an output node No. In other words, an internal standby voltage Vos from the internal standby voltage generating circuit 2 is supplied to the output node No (output OUT) only when the third switch 33 is turned on. Using a CMOS transfer gate for the third switch 33 may suppress the occurrence of noise during switching.

The internal standby voltage Vos from the internal standby voltage generating circuit 2 is input as a criteria level Vs of a first detector 1 (the voltage of a gate 15a of a transistor 15: the voltage of a node NO3) regardless of the state of an enable signal EN (all the time). The first detector 1, the first transistor 10, and the internal standby voltage generating circuit 2 are identical in configuration to those of the foregoing embodiments and thus the explanation thereof is omitted. A reference voltage generating circuit 41, a reference voltage holding capacitor 42, an internal voltage holding capacitor 51, a current load 52 and so on may be provided inside or outside the regulator circuit 200.

As illustrated in FIG. 8, for example, the third switch 33 is turned on in a period Pw in a standby state Sw and a period Pt for switching from the standby state Sw to an active state Sa (or a period for switching from the active state Sa to the standby state Sw). In a period Pa in the active state Sa, the third switch 33 is turned off. In other words, in the period Pa in the active state Sa, the third switch 33 is turned off to isolate the internal standby voltage Vos, which is input from the internal standby voltage generating circuit 2, from the output node No (output OUT). The internal standby voltage Vos from the internal standby voltage generating circuit 2 is always input as the criteria level Vs of the first detector 1.

In the regulator circuit of the third embodiment, the expected level of the internal standby voltage Vos of the internal standby voltage generating circuit 2 is equal to a reference voltage Vr. Since the reference voltage Vr is not directly applied to the gate 15a of the transistor 15, noise transmission to the reference voltage Vr may be prevented in, for example, a period except for the period for switching from the standby state Sw to the active state Sa or switching from the active state Sa to the standby state Sw. For example, in the internal standby voltage generating circuit 2 that generates the internal standby voltage Vos, it is difficult to completely eliminate an error caused by the circuit variations of a second detector 21, and thus the voltage of the output node No is preferably controlled with a target level (expected level) of voltage Vr+error.

Figure 9:
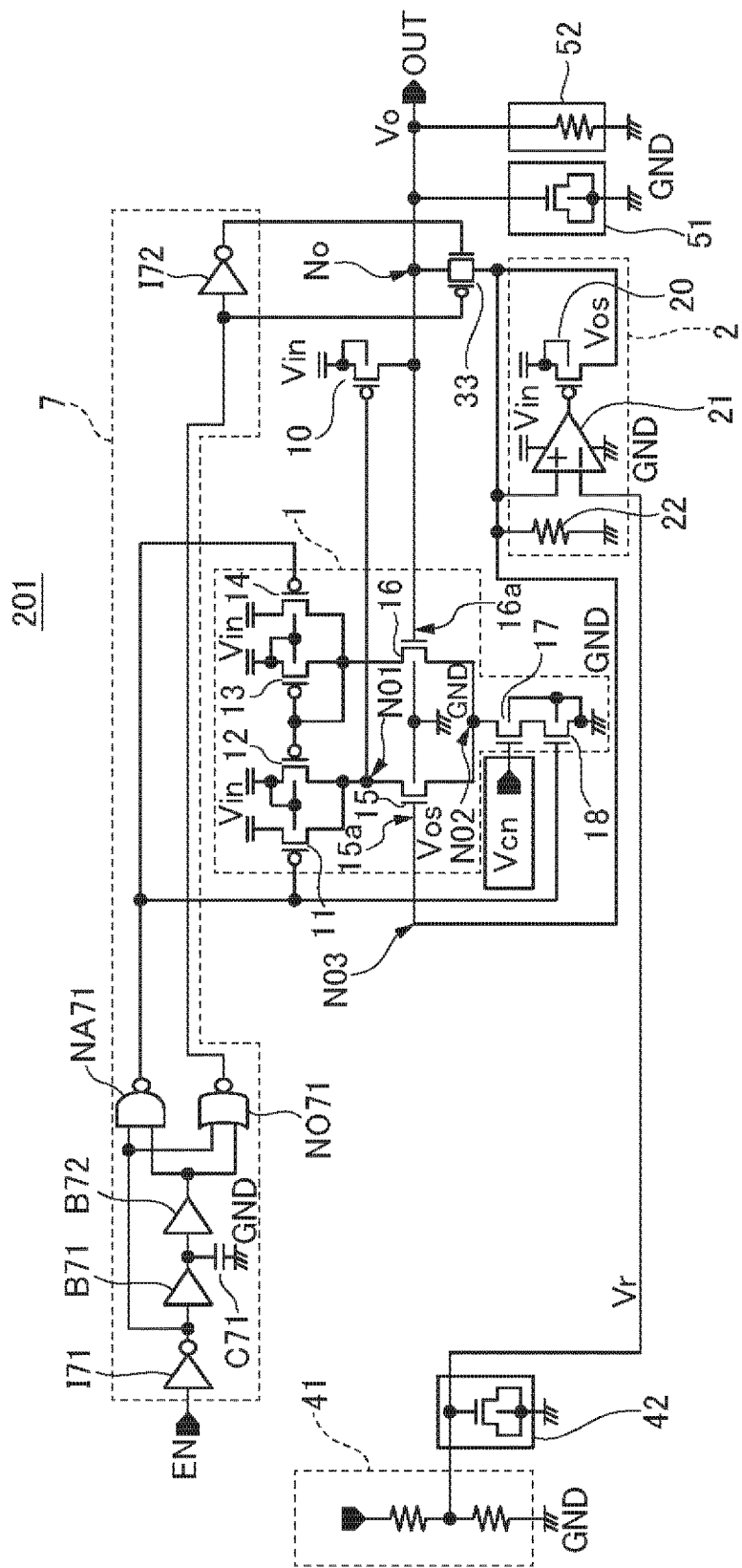
FIG. 9 is a circuit diagram illustrating a fourth embodiment of the regulator circuit.
Figure 10:
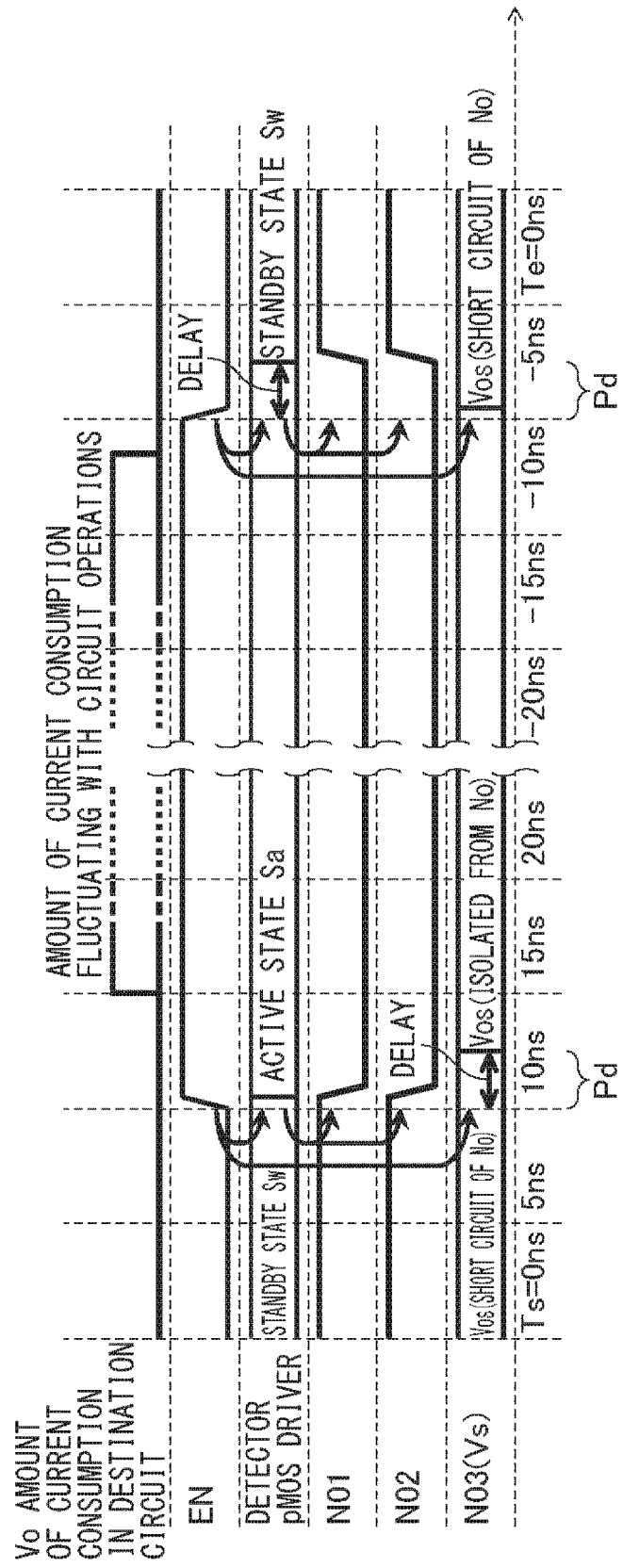
FIG. 10 is an explanatory drawing of an operation of the regulator circuit illustrated in FIG. 9.

FIG. 9 is a circuit diagram illustrating a fourth embodiment of the regulator circuit. FIG. 10 is an explanatory drawing of an operation of the regulator circuit illustrated in FIG. 9. As is evident from a comparison between FIG. 9 and FIG. 7, a regulator circuit 201 of the fourth embodiment further includes a switch control circuit (second switch control circuit) 7 unlike the regulator circuit 200 of the third embodiment.

As illustrated in FIG. 9, the switch control circuit 7 controls an enable signal for the first detector 1 and a third switch 33. The switch control circuit 7 includes Inverters I71 and I72, buffers B71 and B72, a capacitor C71, a NAND gate NA71, and a NOR gate NO71. The switch control circuit 7 controls a standby state Sw and an active state Sa of a first detector 1 and turns on or off the third switch 33 based on the enable signal EN, causing the regulator circuit 201 to perform the operation of FIG. 10. It is apparent that the configuration of the switch control circuit 7 in FIG. 9 is merely exemplary and thus various modifications or changes may be made.

As illustrated in FIG. 10, a shift of the enable signal EN from "L" to "H" activates the first detector 1 and a first transistor 10, changing the voltages of the nodes NO1 and NO2. However, an internal standby voltage Vos is always supplied from the internal standby voltage generating circuit 2 to a node NO3 (a gate 15a of a transistor 15). The third switch 33 is turned off after a delay (delay period Pd) caused by the switch control circuit 7. This reduces the influence of noise, which is caused by a voltage change of nodes NO1 and NO2, on the internal standby voltage Vos. After the third switch 33 is turned off, the first detector 1 in the active state Sa controls the first transistor 10 based on the internal standby voltage Vos. In the active state Sa, an internal active voltage Vo generated by the first transistor 10 is used by, for example, an internal circuit of the subsequent stage, but as described above, the amount of current consumption fluctuates with circuit operations.

A shift of the enable signal EN from "H" to "L" turns on the third switch 33 and inactivates the first detector 1 and the first transistor 10 after the delay period Pd. In other words, a shift of the enable signal EN from "H" to "L" changes the voltages of the nodes NO1 and NO2 but turns on the third switch 33 so as to apply the internal standby voltage Vos to an output node No, thereby reducing the influence of noise.

Figure 11:
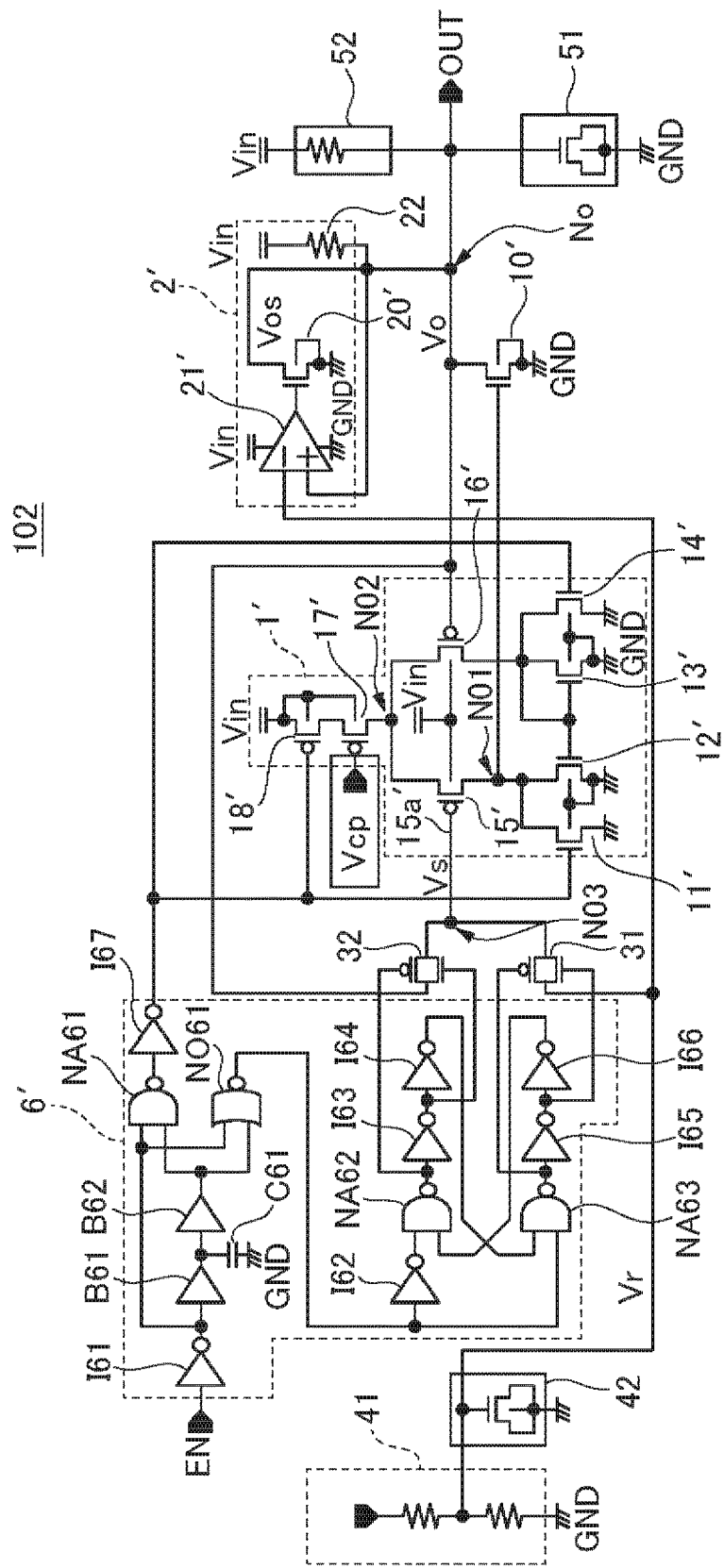
FIG. 11 is a circuit diagram depicting a modification of the regulator circuit according to the second embodiment illustrated in FIG. 5.
Figure 12:
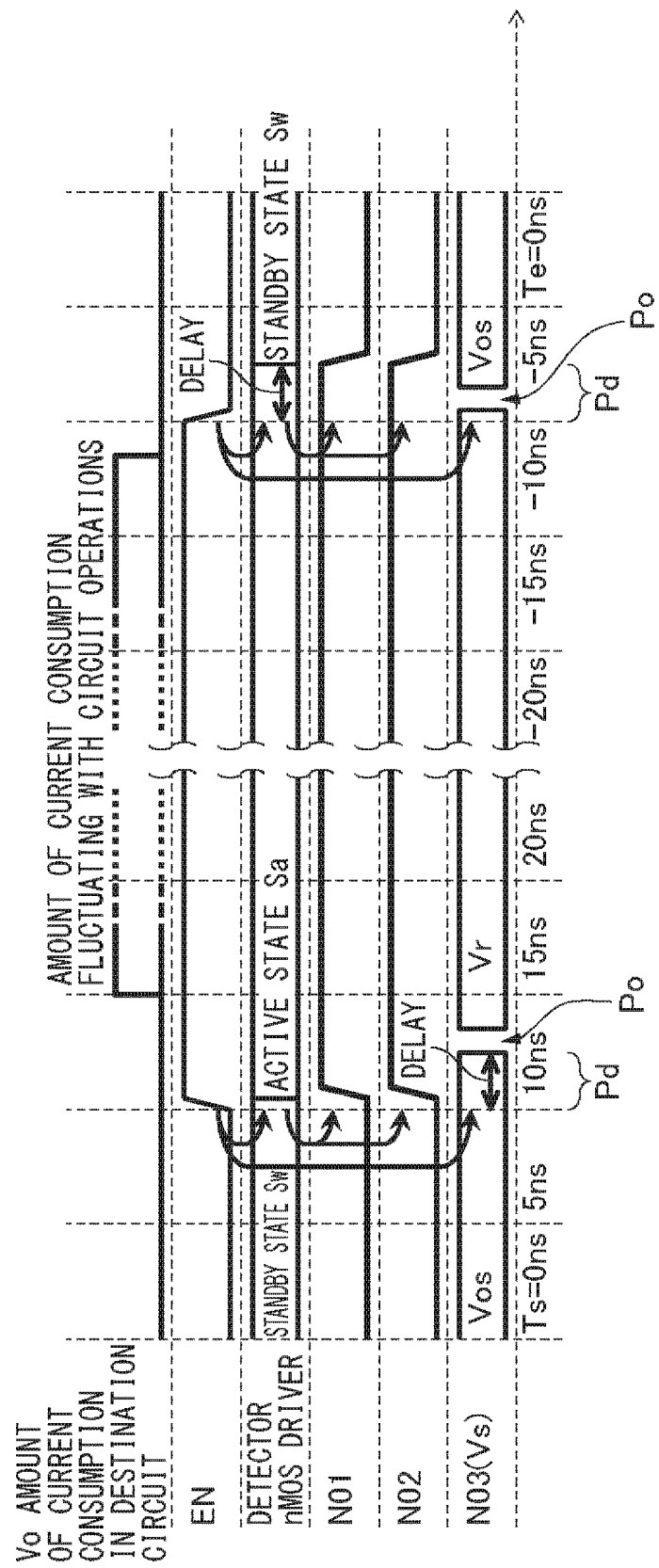
FIG. 12 is an explanatory drawing of an operation of the regulator circuit illustrated in FIG. 11.

FIG. 11 is a circuit diagram illustrating a modification of the regulator circuit according to the second embodiment illustrated in FIG. 5. FIG. 12 is an explanatory drawing of an operation of the regulator circuit illustrated in FIG. 11. As is evident from a comparison between FIG. 11 and FIG. 5, a regulator circuit 102 of the modification includes a pMOS transistor and an nMOS transistor that are reversed from those of the regulator circuit 101 of the second embodiment illustrated in FIG. 5.

In other words, first and second transistors 10' and 20' are nMOS transistors, transistors 11' to 14' in a first detector 1' are nMOS transistors, and transistors 15' to 18' are pMOS transistors. A first switch control circuit 6' further includes an inverter 167 with an inverted control logic unlike the first switch control circuit 6 illustrated in FIG. 5. Moreover, an external control signal Vcp is input to the gate of the transistor 17', and current loads 52 and 22 are provided near an external supply voltage Vin. FIG. 12 corresponds to FIG. 6.

As illustrated in FIG. 12, a shift of an enable signal EN from "L" to "H" activates the first detector 1' and the first transistor 10', changing the voltages of nodes NO1 and NO2. At a node NO3, however, a delay Pd caused by the switch control circuit 6' maintains an off state of the first switch 31 and an on state of the second switch 32 and a connection to an output node No continuously inputs an internal standby voltage Vos from an internal standby voltage generating circuit 2 to the node NO3. This may prevent a voltage change of the nodes NO1 and NO2 from affecting a reference voltage Vr as noise.

After the delay period Pd, the first and second switches 31 and 32 are both turned off in an off period Po, and then the first switch 31 is controlled to be turned on while the second switch 32 is controlled to be turned off. The node NO3 (criteria level Vs) has the reference voltage Vr. Thus, the first detector 1' controls the first transistor 10' to output an internal active voltage Vo to the output node No with the reference voltage Vr which is an expected level.

As described above, the two switches 31 and 32 are turned off in the off period Po in order to prevent a short circuit between the output node No(Vos) and the reference voltage Vr when the voltage of the node NO3 is switched from the internal standby voltage Vos to the reference voltage Vr. In this modification, the internal active voltage Vo generated by the first transistor 10 is used by, for example, an internal circuit of the subsequent stage in the active state Sa but the amount of current consumption fluctuates with circuit operations.

A shift of the enable signal EN from "H" to "L" inactivates the first detector 1' and the first transistor 10' after the delay period Pd. After the off period Po, the first switch 31 is turned off and the second switch 32 is turned on while the node NO3 has the the internal standby voltage Vos of the output node No.

In this way, according to the present embodiment, the set voltage of the first detector 1' that controls the first transistor 10' may be maintained at the specified level (Vr) without being affected by noise caused by switching between a standby state Sw and an active state Sa. This may generate a stable internal voltage without increasing current consumption in the standby state or causing an expanded or complicated circuit area.

Figure 13:
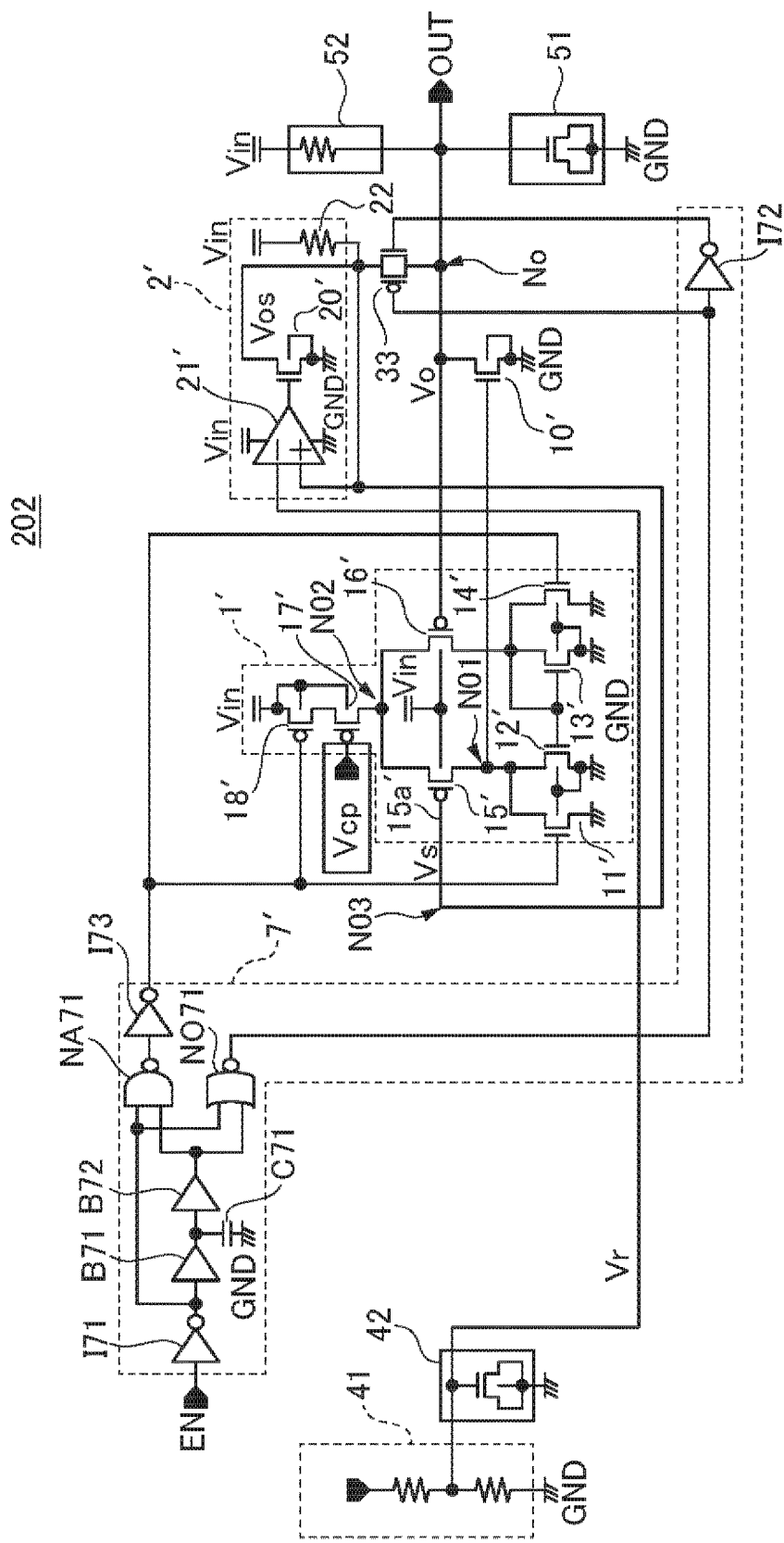
FIG. 13 is a circuit diagram depicting a modification of the regulator circuit according to the fourth embodiment illustrated in FIG. 9.
Figure 14:
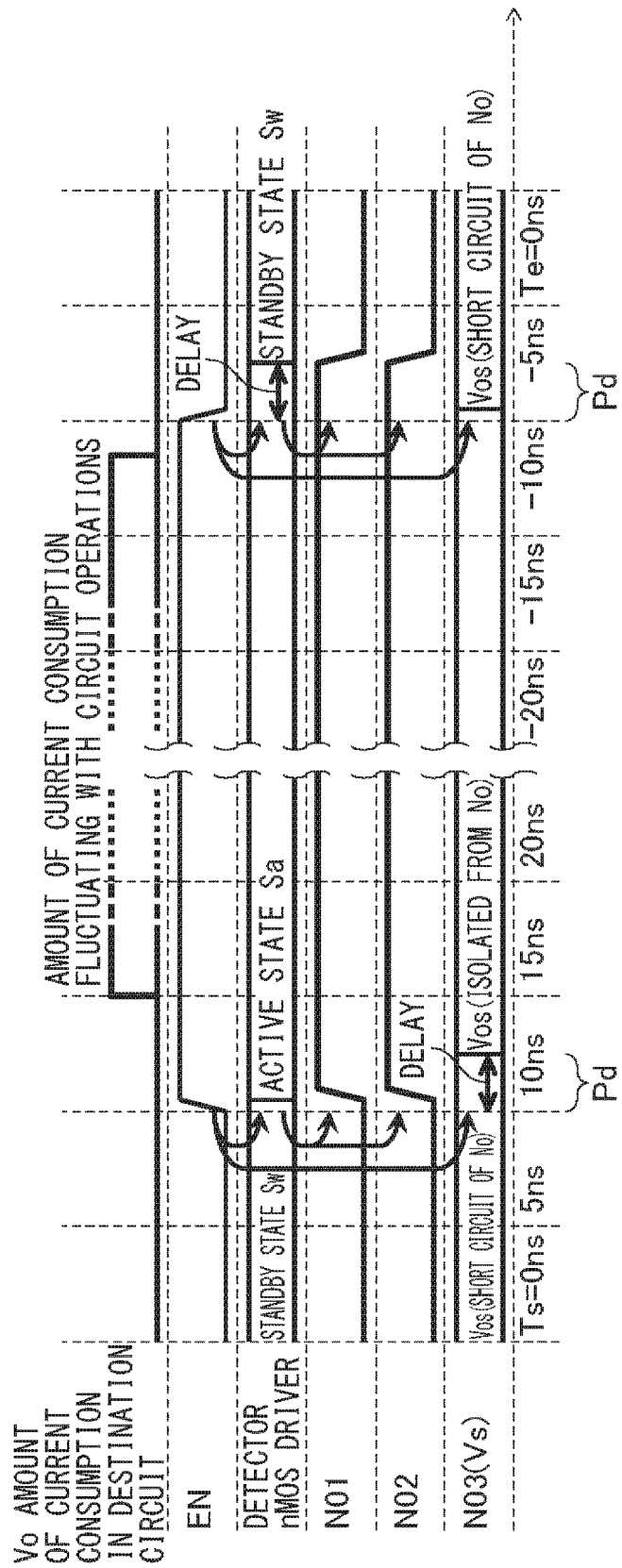
FIG. 14 is an explanatory drawing of an operation of the regulator circuit illustrated in FIG. 13.

FIG. 13 is a circuit diagram illustrating a modification of the regulator circuit according to the fourth embodiment illustrated in FIG. 9. FIG. 14 is an explanatory drawing of an operation of the regulator circuit illustrated in FIG. 13. As is evident from a comparison between FIG. 13 and FIG. 9, a regulator circuit 202 of the modification includes a pMOS transistor and an nMOS transistor that are reversed from those of the regulator circuit 201 of the fourth embodiment illustrated in FIG. 9.

In other words, first and second transistors 10' and 20' are nMOS transistors, transistors 11' to 14' in a first detector 1' are nMOS transistors, and transistors 15' to 18' are pMOS transistors. A second switch control circuit 7' further includes an inverter 173 with an inverted control logic unlike the second switch control circuit 7 illustrated in FIG. 9. Moreover, an external control signal Vcp is input to the gate of the transistor 17', and current loads 52 and 22 are provided near an external supply voltage Vin. FIG. 14 corresponds to FIG. 10.

As illustrated in FIG. 14, a shift of an enable signal EN from "L" to "H" activates the first detector 1' and the first transistor 10', changing the voltages of nodes NO1 and NO2. However, an internal standby voltage Vos is always supplied to a node NO3 (a gate 15a' of the transistor 15') from an internal standby voltage generating circuit 2. The third switch 33 is turned off after a delay Pd caused by the switch control circuit 7'. This reduces the influence of noise, which is caused by a voltage change of the nodes NO1 and NO2, on the internal standby voltage Vos. After the third switch 33 is turned off, the first detector 1' in the active state Sa controls the first transistor 10' based on the internal standby voltage Vos.

A shift of the enable signal EN from "H" to "L" turns on the third switch 33 and inactivates the first detector 1' and the first transistor 10' after the delay period Pd. In other words, a shift of the enable signal EN from "H" to "L" changes the voltages of the nodes NO1 and NO2 but turns on the third switch 33 so as to apply the internal standby voltage Vos to an output node No, thereby reducing the influence of noise.

In this way, the conductivity types may be inverted in the configurations of the transistors of the foregoing embodiments. Moreover, the configurations of the first and second switch circuits or the first and second switch control circuits may be modified and changed.

Figure 15:
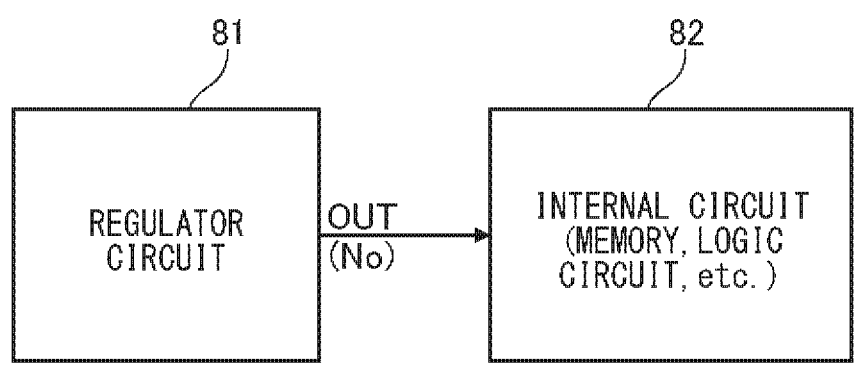
FIG. 15 is a block diagram depicting an example of a semiconductor integrated circuit device including the regulator circuit of the present embodiment.

FIG. 15 is a block diagram illustrating an example of a semiconductor integrated circuit device including the regulator circuit of the present embodiment. As illustrated in FIG. 15, a regulator circuit 81 (100 to 102, 200 to 202) according to the embodiments and the modifications is used as, for example, a circuit that reduces the external supply voltage Vin, generates the internal active voltage Vo(OUT), and supplies the power supply voltage of the internal circuit 82. It is apparent that a semiconductor integrated circuit device 8 including the regulator circuit 81 in FIG. 15 and an internal circuit 82, e.g., memory or a logic circuit may be provided as a single-chip IC (integrated circuit).

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A regulator circuit comprising:
a first transistor of a first conductivity type configured to reduce an external supply voltage and output an internal active voltage to an output node;
a first detector configured to receive a criteria level, detect the internal active voltage based on a state of an enable signal, control a gate voltage of the first transistor, and adjust an output current of the first transistor;
a second transistor of the first conductivity type configured to reduce the external supply voltage, and output an internal standby voltage corresponding to the internal active voltage to the output node;
a second detector configured to receive a reference voltage, detect the internal standby voltage regardless of the state of the enable signal, control a gate voltage of the second transistor, and adjust an output current of the second transistor;
a first switch configured to control whether to output the reference voltage as the criteria level of the first detector; and
a second switch configured to control whether to output the voltage of the output node as the criteria level of the first detector.

2. The regulator circuit according to claim 1, wherein the first switch is a first CMOS transfer gate, and the second switch is a second CMOS transfer gate.

3. The regulator circuit according to claim 1, wherein when the enable signal is placed in a first state, the first detector is inactivated and the internal standby voltage from the second transistor is output to the output node, and
when the enable signal is placed in a second state, the first detector is activated and the internal active voltage from the first transistor and the internal standby voltage from the second transistor are output to the output node.

4. The regulator circuit according to claim 3, wherein the first detector includes:
a first terminal configured to receive the voltage of the output node; and
a second terminal configured to receive the criteria level, and wherein
when the enable signal is placed in the second state, the activated first detector compares the levels of the first terminal and the second terminal and adjusts the output amount of the first transistor.

5. The regulator circuit according to claim 3, the regulator circuit further comprising a first switch control circuit configured to control on/off of the first switch and the second switch, wherein
when the enable signal is placed in the first state, the first switch control circuit turns off the first switch, turns on the second switch, and applies the internal standby voltage as the criteria level so as to keep a standby state, and
when the enable signal changes from the first state to the second state, the first switch control circuit turns off both of the first switch and the second switch after a specified delay, and subsequently the first switch control circuit turns on the first switch, turns off the second switch, and applies the reference voltage as the criteria level so as to activate the first detector.

6. The regulator circuit according to claim 1, the regulator circuit further comprising:
a reference voltage generating circuit configured to generate the reference voltage; and
a reference voltage holding capacitor configured to hold the generated reference voltage.

7. The regulator circuit according to claim 1, the regulator circuit further comprising:
an internal voltage holding capacitor that holds the voltage of the output node; and
a current load that prevents an excessive change of the potential of the output node.

8. The regulator circuit according to claim 1, wherein the first transistor of the first conductivity type is a first p-channel MOS transistor, and
the second transistor of the first conductivity type is a second p-channel MOS transistor.

9. A regulator circuit comprising:
a first transistor of a first conductivity type configured to reduce an external supply voltage and output an internal active voltage to an output node;
a first detector configured to receive a criteria level, detect the internal active voltage based on a state of an enable signal, control a gate voltage of the first transistor, and adjust an output current of the first transistor;
a second transistor of the first conductivity type configured to reduce the external supply voltage, and output an internal standby voltage corresponding to the internal active voltage to the output node;
a second detector configured to receive a reference voltage, detect the internal standby voltage regardless of the state of the enable signal, control a gate voltage of the second transistor, and adjust an output current of the second transistor; and
a third switch configured to control whether to output the internal standby voltage to the output node, wherein
the internal standby voltage is input as the standard potential of the first detector.

10. The regulator circuit according to claim 9, wherein the third switch is a third CMOS transfer gate with one end connected to the output node and the other end receiving the internal standby voltage.

11. The regulator circuit according to claim 9, wherein when the enable signal is placed in a first state, the first detector is inactivated and the internal standby voltage from the second transistor is output to the output node, and
when the enable signal is placed in a second state, the first detector is activated and the internal active voltage from the first transistor is output to the output node.

12. The regulator circuit according to claim 11, wherein the first detector includes:
a first terminal that receives the voltage of the output node; and
a second terminal that receives the internal standby voltage, and wherein
when the enable signal is placed in the second state, the activated first detector compares the levels of the first terminal and the second terminal and adjusts the output amount of the first transistor.

13. The regulator circuit according to claim 11, the regulator circuit further comprising a second switch control circuit that controls on/off of the third switch, wherein
  when the enable signal is placed in the first state, the second switch control circuit turns on the third switch and outputs the internal standby voltage to the output node so as to keep a standby state, and
  when the enable signal changes from the first state to the second state, the second switch control circuit turns off the third switch after a specified delay, and subsequently the second switch control circuit isolates the internal standby voltage from the output node and applies the internal standby voltage only as the criteria level so as to activate the first detector.

14. The regulator circuit according to claim 9, the regulator circuit further comprising:
  a reference voltage generating circuit configured to generate the reference voltage; and
  a reference voltage holding capacitor configured to hold the generated reference voltage.

15. The regulator circuit according to claim 9, the regulator circuit further comprising:
  an internal voltage holding capacitor that holds the voltage of the output node; and
  a current load that prevents an excessive change of the potential of the output node.

16. The regulator circuit according to claim 9, wherein
  the first transistor of the first conductivity type is a first p-channel MOS transistor, and
  the second transistor of the first conductivity type is a second p-channel MOS transistor.

17. A semiconductor integrated circuit device comprising:
  a regulator circuit; and
  an internal circuit where the voltage of the output node of the regulator circuit is used, wherein
  the regulator circuit comprises:
  a first transistor of a first conductivity type configured to reduce an external supply voltage and output an internal active voltage to an output node;
  a first detector configured to receive a criteria level, detect the internal active voltage based on a state of an enable signal, control a gate voltage of the first transistor, and adjust an output current of the first transistor;
  a second transistor of the first conductivity type configured to reduce the external supply voltage, and output an internal standby voltage corresponding to the internal active voltage to the output node;
  a second detector configured to receive a reference voltage, detect the internal standby voltage regardless of the state of the enable signal, control a gate voltage of the second transistor, and adjust an output current of the second transistor;
  a first switch configured to control whether to output the reference voltage as the criteria level of the first detector; and
  a second switch configured to control whether to output the voltage of the output node as the criteria level of the first detector.

18. The semiconductor integrated circuit device according to claim 17, wherein the internal circuit is a memory circuit or a logic circuit.

* * * * *